(12) United States Patent
Shahana et al.

(10) Patent No.: US 11,077,915 B2
(45) Date of Patent: Aug. 3, 2021

(54) CONTROL DEVICE AND TRANSMISSION SYSTEM

(71) Applicant: Shimano Inc., Osaka (JP)

(72) Inventors: Satoshi Shahana, Osaka (JP);
Mitsuhiko Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 93 days.

(21) Appl. No.: 16/574,837

(22) Filed: Sep. 18, 2019

(65) Prior Publication Data

US 2020/0108889 A1 Apr. 9, 2020

(30) Foreign Application Priority Data

Oct. 3, 2018 (JP) .............................. JP2018-188580

(51) Int. Cl.
| | |
|---|---|
| *B62M 9/123* | (2010.01) |
| *B62M 25/08* | (2006.01) |
| *B62M 9/122* | (2010.01) |
| *B62M 1/36* | (2013.01) |
| *B62M 9/132* | (2010.01) |
| *B62M 9/133* | (2010.01) |

(52) U.S. Cl.
CPC .............. *B62M 9/123* (2013.01); *B62M 1/36* (2013.01); *B62M 9/122* (2013.01); *B62M 9/132* (2013.01); *B62M 9/133* (2013.01); *B62M 25/08* (2013.01)

(58) Field of Classification Search
CPC ...... B62M 9/133; B62M 9/132; B62M 9/123; B62M 9/122; B62M 25/08
See application file for complete search history.

(56) References Cited

U.S. PATENT DOCUMENTS

| | | | | |
|---|---|---|---|---|
| 9,026,288 | B2 * | 5/2015 | Durdevic | B60L 50/20 701/22 |
| 10,450,031 | B2 * | 10/2019 | Djakovic | B62M 9/132 |
| 2018/0118211 | A1 * | 5/2018 | Tsuchizawa | B62M 6/45 |

FOREIGN PATENT DOCUMENTS

JP         2018-70001 A        5/2018

* cited by examiner

*Primary Examiner* — Erin D Bishop
(74) *Attorney, Agent, or Firm* — Global IP Counselors, LLP

(57) ABSTRACT

A control device includes an electronic controller configured to control a transmission device of a human-powered vehicle in accordance with a shifting condition. The electronic controller is configured to monitor a torque applied to the human-powered vehicle upon determining the human-powered vehicle is ridden and driven. The electronic controller is configured to permit a shifting operation of the transmission device in accordance with a peak value of the torque upon determining the shifting condition is satisfied.

14 Claims, 6 Drawing Sheets

CONTROL DEVICE AND TRANSMISSION SYSTEM

CROSS-REFERENCE TO RELATED APPLICATIONS

This application claims priority to Japanese Patent Application No. 2018-188580, filed on Oct. 3, 2018. The entire disclosure of Japanese Patent Application No. 2018-188580 is hereby incorporated herein by reference.

BACKGROUND

Technical Field

The present invention generally relates to a control device and a transmission system.

Background Information

A control device of a human-powered vehicle changes a transmission stage of a transmission device in accordance with rotational speed of a crank per unit time and traveling speed of the human-powered vehicle. In one example, the control device performs a shifting operation with the transmission device in a case where a crank arm is located at a top dead center or a bottom dead center so that the transmission device does not perform a shifting operation at the peak of torque applied to the crank (for example, refer to Japanese Laid-Open Patent Publication No. 2018-70001—Patent Document 1).

SUMMARY

The relationship of a rotational angle of the crank and the peak of the torque applied to the crank changes, for example, in accordance with the posture of a user riding the human-powered vehicle and inclination of the human-powered vehicle (gradient of hill). It is preferred that the shifting operation of the transmission device is completed at a timing that differs from the peak of the torque applied to the crank with further accuracy.

One object of the present disclosure is to provide a control device and a transmission system that reduce awkwardness that the user experiences during a shifting operation.

A control device in accordance with a first aspect of the present disclosure comprises an electronic controller configured to control a transmission device of a human-powered vehicle in accordance with a shifting condition. The electronic controller is configured to monitor a torque applied to the human-powered vehicle upon determining the human-powered vehicle is ridden and driven. Further, the electronic controller is configured to permit a shifting operation of the transmission device in accordance with a peak value of the torque upon determining the shifting condition is satisfied.

With the control device in accordance with the first aspect, the peak value of the torque upon determining the human-powered vehicle is ridden and driven is monitored so that the shifting operation of the transmission device is completed at a timing that differs from the torque peak. This reduces awkwardness that the user experiences during a shifting operation.

In accordance with a second aspect of the present disclosure, the control device according to the first aspect is configured so that the electronic controller is configured to permit the shifting operation of the transmission device upon determining the torque is equal to a predetermined proportion of the peak value.

With the control device in accordance with the second aspect, the shifting operation of the transmission device is easily completed at a timing that differs from the torque peak. This reduces awkwardness that the user experiences during a shifting operation.

In accordance with a third aspect of the present disclosure, the control device according to the first or second aspect is configured so that the shifting condition is set based on a first reference value and a threshold value of the human-powered vehicle. Further, the electronic controller is configured to automatically control the transmission device in accordance with the shifting condition.

With the control device in accordance with the third aspect, the transmission device automatically performs the shifting operation in accordance with the shifting condition. That is, the transmission device performs the shifting operation without the user performing the shifting operation. Thus, the user can ride the human-powered vehicle comfortably.

In accordance with a fourth aspect of the present disclosure, the control device according to any one of the first to third aspects is configured so that the shifting condition is set based on input to an operation unit of the human-powered vehicle. Further, the electronic controller is configured to control the transmission device in accordance with the input to the operation unit.

With the control device in accordance with the fourth aspect, the transmission device performs the shifting operation in accordance with the input to the operation unit. This allows the user to change a transmission ratio of the human-powered vehicle at a preferred timing.

In accordance with a fifth aspect of the present disclosure, the control device according to the second aspect is configured so that the human-powered vehicle includes a crank. Further, the electronic controller is configured to vary the predetermined proportion in correspondence with rotational speed of the crank.

With the control device in accordance with the fifth aspect, a time interval between two adjacent peak values is changed in accordance with the rotational speed of the crank per unit time. Thus, the shifting operation of the transmission device is easily completed at a timing that differs from the torque peak with higher accuracy upon determining the predetermined proportion is varied in correspondence with rotational speed of the crank. This further reduces awkwardness that the user experiences during a shifting operation.

In accordance with a sixth aspect of the present disclosure, the control device according to the second aspect is configured so that the human-powered vehicle includes a crank, a wheel, a driving rotation body, a driven rotation body, and a linking member. The driving rotation body is rotated as the crank rotates. The driven rotation body is provided on the wheel. The linking member is wound around the driving rotation body and the driven rotation body. Further, the electronic controller is configured to vary the predetermined proportion in accordance with at least one of a communication time of a control signal from the electronic controller to the transmission device, an operation time of the transmission device, and a movement time of the linking member resulting from operation of the transmission device.

With the control device in accordance with the sixth aspect, the electronic controller calculates the time from a point of time at which the electronic controller starts controlling the shifting operation of the transmission device to a point of time at which the shifting operation of the transmission device is completed. The electronic controller varies the predetermined proportion in accordance with the calculated time. Thus, the shifting operation of the transmission device is easily completed at a timing that differs from the torque peak with higher accuracy. This further reduces awkwardness that the user experiences during a shifting operation.

A control device in accordance with a seventh aspect of the present disclosure is configured to control a transmission device of a human-powered vehicle. The human-powered vehicle includes a crank, a wheel, a driving rotation body, a driven rotation body, a driven rotation body, a linking member, and the transmission. The driving rotation body is rotated as the crank rotates. The driven rotation body is provided on the wheel. The linking member is wound around the driving rotation body and the driven rotation body. The transmission device moves the linking member between a first rotation body and second rotation body provided on at least one of the driving rotation body and the driven rotation body. The control device comprises an electronic controller configured to monitor torque applied to the human-powered vehicle upon determining the human-powered vehicle is ridden and driven. The electronic controller is configured to control the transmission device so that movement of the linking member from one of the first rotation body and the second rotation body to the other one of the first rotation body and the second rotation body is completed at a timing that differs from a peak value of the torque.

The control device in accordance with the seventh aspect monitors the peak value of the torque applied to the human-powered vehicle upon determining the human-powered vehicle is ridden and driven to complete the shifting operation of the transmission device at a timing that differs from the peak of the torque. This reduces awkwardness that the user experiences during a shifting operation.

In accordance with an eighth aspect of the present disclosure, the control device according to any one of the first to seventh aspects is configured so that the electronic controller is configured to acquire a maximum value of the torque in a range in which the torque is switched from an increasing tendency to a decreasing tendency as the peak value of the torque.

With the control device in accordance with the eighth aspect, the peak value of the torque can be correctly acquired.

In accordance with a ninth aspect of the present disclosure, the control device according to any one of the first to eighth aspects is configured so that the electronic controller is configured to set a shifting wait time that is a time from a point of time at which a shifting condition of the human-powered vehicle is satisfied to a point of time at which a shifting operation of the transmission device is permitted in accordance with a number of peaks of the torque from the point of time at which a signal related to a shifting instruction from an operation unit of the human-powered vehicle is received or at which the shifting condition is satisfied.

With the control device in accordance with the ninth aspect, the shifting operation of the transmission device can be completed at a timing that differs from the peak of the torque, for example, even upon determining the user changes the shifting wait time.

In accordance with a tenth aspect of the present disclosure, the control device according to the ninth aspect is configured so that upon determining the number of peaks of the torque, from the point of time at which the electronic controller receives a signal related to a shifting instruction from the operation unit or at which the shifting condition is satisfied, becomes equal to a first threshold value, the electronic controller is configured to permit a shifting operation of the transmission device if the torque becomes equal to a predetermined proportion of the peak value of the torque, the peak value of the torque being a value of the torque at a time when the number of peaks of the torque has reached the first threshold value.

With the control device in accordance with the tenth aspect, the shifting operation of the transmission device can be completed at a timing that differs from the peak of the torque, for example, even upon determining the user changes the shifting wait time.

In accordance with an eleventh aspect of the present disclosure, the control device according to the tenth aspect is configured so that the first threshold value is variable.

The control device in accordance with the eleventh aspect enhances the degree of freedom for changing the shifting wait time.

A control device in accordance with a twelfth aspect of the present disclosure is configured to control a transmission device of a human-powered vehicle. The human-powered vehicle includes a crank, a wheel, a driving rotation body, a driven rotation body, a driven rotation body, a linking member, and the transmission device. The driving rotation body is rotated as the crank rotates. The driven rotation body is provided on the wheel. The linking member is wound around the driving rotation body and the driven rotation body. The transmission device moves the linking member between a first rotation body and second rotation body provided on at least one of the driving rotation body and the driven rotation body. The control device comprises an electronic controller configured to control a timing for starting operation of the transmission device in accordance with at least one of a communication time of a control signal to the transmission device, an operation time of the transmission device, and a movement time of the linking member resulting from operation of the transmission device.

With the control device in accordance with the twelfth aspect, the electronic controller calculates the time from a point of time at which the electronic controller starts controlling the shifting operation of the transmission device to a point of time at which the shifting operation of the transmission device is completed. The electronic controller varies the predetermined proportion in accordance with the calculated time. Thus, the shifting operation of the transmission device is easily completed at a timing that differs from the torque peak with higher accuracy. This further reduces awkwardness that the user experiences during a shifting operation.

In accordance with a thirteenth aspect of the present disclosure, the control device according to any one of the first to twelfth aspects is configured so that the electronic controller is configured to calculate a rotational speed of the crank in accordance with a peak cycle of a torque applied to a crank of the human-powered vehicle.

The control device in accordance with the thirteenth aspect does not need a detector for detecting the rotational speed of the crank per unit time. This simplifies the configuration of the human-powered vehicle.

A transmission system in accordance with a fourteenth aspect of the present disclosure comprises the control device in accordance with any one of the first to thirteenth aspects and the transmission device.

The transmission system in accordance with the fourteenth aspect reduces awkwardness that the user experiences during a shifting operation.

The control device and transmission system in accordance with the present disclosure reduce awkwardness that the user experiences during a shifting operation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
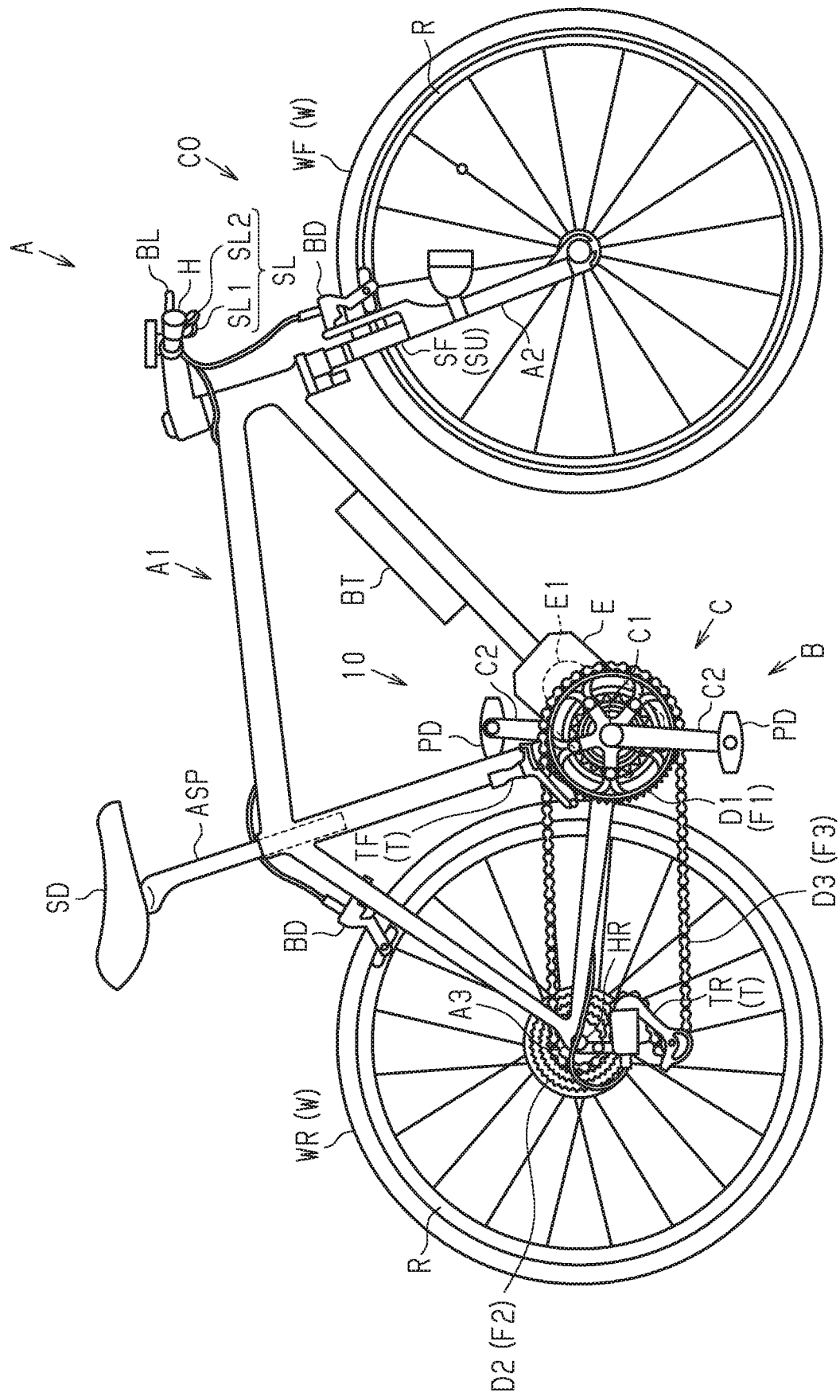
FIG. 1 is a side elevational view of a human-powered vehicle including a control device and a transmission system in accordance with an embodiment.

A human-powered vehicle A including a transmission system 10 will now be described with reference to FIG. 1. The human-powered vehicle is a vehicle that can be driven by at least human force, which includes a vehicle that assists human force with electric driving. The human-powered vehicle does not include vehicles using only a prime mover that is not human force. In particular, the human-powered vehicle does not include vehicles that use only an internal combustion engine as the prime mover. The human-powered vehicle is a compact light vehicle that does not require a license for driving on a public road. The illustrated human-powered vehicle A is a bicycle (e-bike) including an electric assist unit E that assists the propulsion of the human-powered vehicle A by using electric energy. Specifically, the illustrated human-powered vehicle A is a trekking bike.

The human-powered vehicle A further includes a frame A1, a front fork A2, and a handlebar H. The human-powered vehicle A includes a crank C, a wheel W, a driving rotation body F1, a driven rotation body F2, and a linking member F3. The driving rotation body F1 is rotated in accordance with rotation of the crank C. The driven rotation body F2 is provided on the wheel W. The linking member F3 is wound around the driving rotation body F1 and the driven rotation body F2. The driving rotation body F1 includes one or more front sprockets D1. The driven rotation body F2 includes one or more rear sprockets D2. The linking member F3 includes a chain D3. The crank C, the front sprocket D1, the rear sprocket D2, and the chain D3 form a drive train B. The drive train B is of a chain drive type. The drive train B can be of any type such as a belt drive type.

The crank C includes a crankshaft C1 and two crank arms C2. The crankshaft C1 is rotatably supported by the frame A1. The two crank arms C2 are provided on two ends of the crankshaft C1, respectively. A pedal PD is rotatably coupled to a distal end of each crank arm C2.

The front sprocket D1 is provided on the crank C so as to rotate integrally with the crankshaft C1. The rear sprocket D2 is provided on a hub HR of a rear wheel WR. The chain D3 is wound around the front sprocket D1 and the rear sprocket D2. The driving force applied to the pedals PD by a user riding the human-powered vehicle A is transmitted via the front sprocket D1, the chain D3, and the rear sprocket D2 to the rear wheel WR.

The human-powered vehicle A includes a transmission device T. The transmission device T moves the linking member F3 between a first rotation body and a second rotation body provided on at least one of the driving rotation body F1 and the driven rotation body F2. In a case where the first rotation body and the second rotation body are provided on the driving rotation body F1, the first rotation body corresponds to one of multiple front sprockets D1, and the second rotation body corresponds to another one of the multiple front sprockets D1 that differs from the first rotation body. In this case, the driven rotation body F2 can be one or more rear sprockets D2. In a case where the first rotation body and the second rotation body are provided on the driven rotation body F2, the first rotation body corresponds to one of the multiple rear sprockets D2, and the second rotation body corresponds to another one of the multiple rear sprockets D2 that differs from the first rotation body. In this case, the driving rotation body F1 can be one or more front sprockets D1.

The transmission device T includes at least one of a front transmission device TF and a rear transmission device TR. The front transmission device TF is, for example, a front derailleur provided in the vicinity of the front sprockets D1. The front transmission device TF is driven to change the front sprocket D1, around which the chain D3 is wound, thereby changing a transmission ratio of the human-powered vehicle A. The rear transmission device TR is, for example, a rear derailleur provided at a rear end A3 of the frame A1. The rear transmission device TR is driven to change the rear sprocket D2, around which the chain D3 is wound, thereby changing the transmission ratio of the human-powered vehicle A. The transmission device T can be configured as an internal type such as an internal geared hub. Further, the transmission device T can be a continuously variable transmission.

The transmission device T is shifted to a plurality of transmission stages. The front transmission device TF includes one or more transmission stages. The number of transmission stages of the front transmission device TF corresponds to the number of the front sprockets D1. The rear transmission device TR includes one or more transmission stages. The number of transmission stages of the rear transmission device TR corresponds to the number of the rear sprockets D2. The number of stages that the transmission device T is shifted to is determined by the product of the number of transmission stages of the front transmission device TF and the number of transmission stages of the rear transmission device TR. The transmission ratio of the human-powered vehicle A, which is a ratio of the rotational speed of the rear sprocket D2 to the rotational speed of the front sprocket D1, is determined by the relationship of the number of teeth corresponding to the transmission stage of the front transmission device TF and the number of teeth corresponding to the transmission stage of the rear transmission device TR. In a case where the transmission device T is a continuously variable transmission, the ratio of output rotational speed to input rotational speed can be referred to as the transmission ratio of the human-powered vehicle A.

The transmission device T is electrically driven in accordance with operation of operation units SL. One operation unit SL is provided on the right side of the handlebar H, and the other operation unit SL is provided on the left side of the handlebar H. In one example, the front transmission device TF is electrically driven in accordance with operation of one operation unit SL, and the rear transmission device TR is electrically driven in accordance with operation of the other operation unit SL. The operation unit SL includes a first shift lever SL1 for upshifting and a second shift lever SL2 for downshifting. In a case where the first shift lever SL1 is operated, for example, the transmission device T is driven to shift to a transmission stage that is one or more stages higher than the current transmission stage. In a case where the second shift lever SL2 is operated, for example, the transmission device T is driven to shift to a transmission stage that is one or more stages lower than the current transmission stage.

The human-powered vehicle A further includes one or more components CO. The component CO includes at least one of brake devices BD, a suspension SU, an adjustable seat post ASP, and the electric assist unit E. The brake devices BD, the suspension SU, and the adjustable seat post ASP can be mechanically driven in accordance with the operation of a corresponding operation device or electrically driven in accordance with the operation of a corresponding operation device. Electrically driven ones of the components CO are actuated by, for example, electric power supplied from a battery BT mounted on the human-powered vehicle A or electric power supplied from a dedicated power supply (not shown) corresponding to each component CO.

The number of brake devices BD corresponds to the number of wheels. In the present embodiment, the human-powered vehicle A includes the brake device BD corresponding to the front wheel WF and the brake device BD corresponding to the rear wheel WR. The two brake devices BD have the same construction. Each brake device BD is, for example, a rim brake device for braking a corresponding rim R of the human-powered vehicle A. In one example, each brake device BD is driven mechanically or electrically in accordance with the operation of a corresponding brake lever BL (operation device). The brake device BD can be a disc brake device for braking a disc brake rotor (not shown) mounted on the human-powered vehicle A.

The suspension SU includes at least one of a front suspension SF and a rear suspension (not shown). The front suspension SF is actuated to absorb the impact that the front wheel WF receives from the ground. The rear suspension is actuated to absorb the impact that the rear wheel WR receives from the ground. The adjustable seat post ASP is actuated to change the height of a saddle SD relative to the frame A1. The electric assist unit E is actuated to assist the propulsion of the human-powered vehicle A. The electric assist unit E is actuated, for example, in accordance with the driving force applied to the pedals PD. The electric assist unit E includes an electric motor µl.

Figure 2:
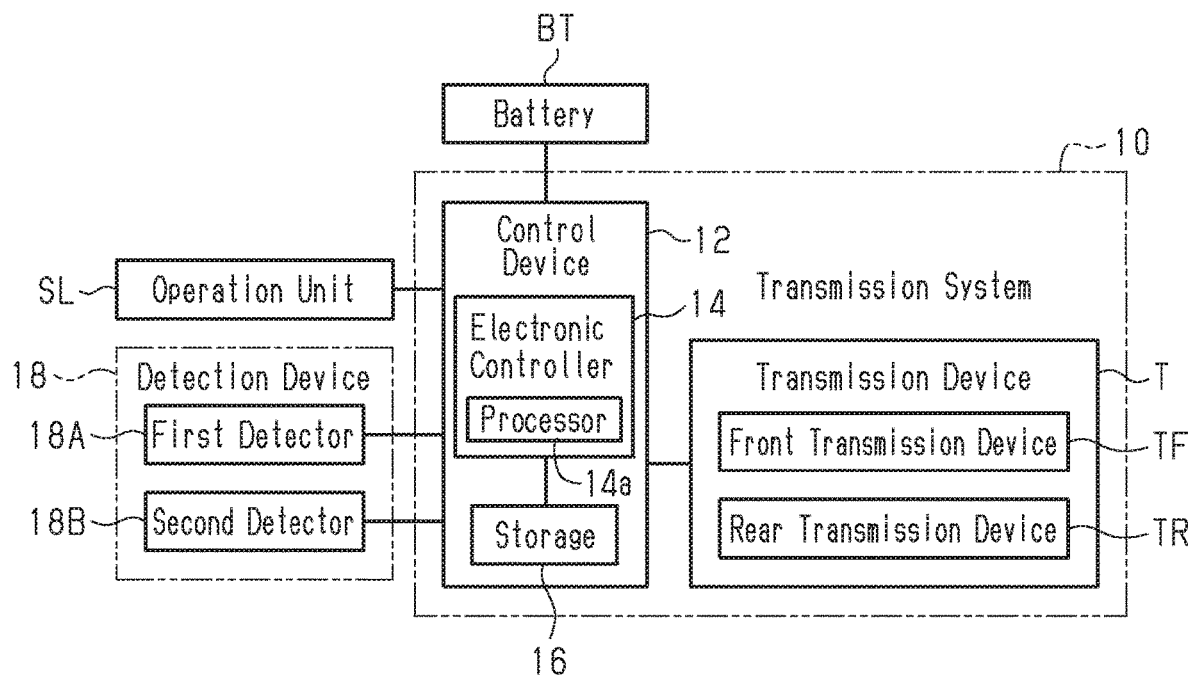
FIG. 2 is a block diagram of a transmission system and showing electrical connections between the control device shown in FIG. 1 and various components.

The configuration of the transmission system 10 will now be described with reference to FIG. 2. The transmission system 10 includes a control device 12 and the transmission device T. The transmission system 10 is actuated, for example, by electric power supplied from the battery BT. The control device 12 includes an electronic controller 14 that is configured to control the transmission device T of the human-powered vehicle A in accordance with a shifting condition. The electronic controller 14 is formed of one or more semiconductor chips that are mounted on a circuit board. The term "electronic controller" as used herein refers to hardware that executes a software program, and does not include a human. For simplicity, the electronic controller 14 will be hereinafter referred to as the controller 14. The controller 14 automatically controls the transmission device T in accordance with the shifting condition. In one example, the shifting condition is set based on a first reference value and a threshold value TH of human-powered vehicle A.

The first reference value includes vehicle information related to the human-powered vehicle A. The vehicle information includes at least one of traveling information related to a traveling condition of the human-powered vehicle A and environment information related to a traveling environment of the human-powered vehicle A. The traveling information includes at least one of cadence, torque Tr applied to the human-powered vehicle A, vehicle speed, acceleration, and power. The torque Tr includes the torque applied to the crank C. Power is the product of cadence and the torque Tr. The environment information includes at least one of road surface information related to the condition of the road surface, air resistance information related to the air resistance, weather information related to the weather, and temperature information related to the temperature. The road surface information includes at least one of resistance information related to a resistance of the road surface and inclination information related to an inclination of the road surface. The resistance of road surface differs depending on scree (loose stones on the road surface), gravel, asphalt, and the like. The air resistance information includes information related to air resistance acting on the user and the human-powered vehicle A in a case where the human-powered vehicle A is traveling. In one example, the air resistance information includes wind information related to wind power such as wind speed, wind pressure, and wind direction.

The threshold value TH includes an upper limit threshold value THU and a lower limit threshold value THL. The controller 14 controls the transmission device T so that the transmission ratio of the human-powered vehicle A increases in accordance with the relationship of the first reference value and the upper limit threshold value THU. Further, the controller 14 controls the transmission device T so that the transmission ratio decreases in accordance with the relationship of the first reference value and the lower limit threshold value THL. In one example, the controller 14 controls the transmission device T so that the transmission ratio increases upon determining the first reference value becomes greater than the upper limit threshold value THU and controls the transmission device T so that the transmission ratio decreases upon determining the first reference value becomes less than the lower limit threshold value THL.

In one example, the shifting condition is set based on input to the operation unit SL of the human-powered vehicle A. The controller 14 controls the transmission device T in accordance with the input to the operation unit SL. The controller 14 controls the transmission device T so that the transmission ratio increases upon determining the first shift lever SL1 is operated and controls the transmission device T so that the transmission ratio decreases upon determining the second shift lever SL2 is operated. The controller 14 is a central processing unit (CPU) or a micro-processing unit (MPU) that includes at least one processor 14a. The controller 14 can be configured to control the electrically-driven components CO in addition to the transmission device T.

The control device 12 further includes storage 16 that stores information. The storage 16 is any computer storage device or any non-transitory computer-readable medium with the sole exception of a transitory, propagating signal. For example, the storage 16 includes a non-volatile memory and a volatile memory. The storage 16 stores, for example, various control programs and preset information. In one example, the storage 16 stores information related to multiple control modes and the like. The controller 14 may be one or more integrated circuits having firmware for causing the circuitry to complete the activities described herein. Of course, any number of other analog and/or digital components capable of performing the below described functionality can be provided in place of, or in conjunction with the described controller elements.

The human-powered vehicle A further includes a detection device 18 that detects various information. The detection device 18 includes a first detector 18A and a second detector 18B. The detector 18A and the second detector 18B each output a detection result to the control device 12. The detector 18A includes, for example, a sensor that detects the rotational speed of the crank C (cadence) per unit time. The second detector 18B includes, for example, a sensor that detects the torque Tr applied to the human-powered vehicle A. The second detector 18B is mounted, for example, on the crankshaft C1. The second detector 18B detects the torque Tr applied to the human-powered vehicle A in accordance with the torsion about the center axis of the crankshaft C1. The detector 18A and the second detector 18B can each use a known sensor. The detection device 18 can further include a sensor other than the detector 18A and the second detector 18B. In one example, the other sensor includes at least one of a sensor for detecting the vehicle speed representing the traveling speed of the human-powered vehicle and a sensor for detecting the acceleration of the human-powered vehicle.

A content of the control executed on the transmission device T by the controller 14 will now be described in detail. As the control of the transmission device T, the controller 14 monitors the torque applied to the human-powered vehicle A upon determining the human-powered vehicle A is ridden and driven. Further, the controller 14 permits a shifting operation of the transmission device T in accordance with a peak value Trp of the torque Tr upon determining the shifting condition is satisfied. Specifically, the controller 14 monitors the torque Tr applied to the human-powered vehicle A upon determining the human-powered vehicle A is ridden and driven and controls the transmission device T so that movement of the linking member F3 from one of the first rotation body and the second rotation body to the other one of the first rotation body and the second rotation body is completed at a timing that differs from the peak value Trp of the torque Tr. In a case where the transmission device T is the front transmission device TF, the first rotation body corresponds to one of the multiple front sprockets D1, and the second rotation body corresponds to another one of the front sprockets D1 that differs from the first rotation body. In a case where the transmission device T is the rear transmission device TR, the first rotation body corresponds to one of the multiple rear sprockets D2, and the second rotation body corresponds to another one of the rear sprockets D2 that differs from the first rotation body. In a case where the human-powered vehicle A is ridden and driven, the user riding the human-powered vehicle A rotates the crank C by driving the pedals PD, that is, the human-powered vehicle A is ridden and driven by human force.

Figure 3:
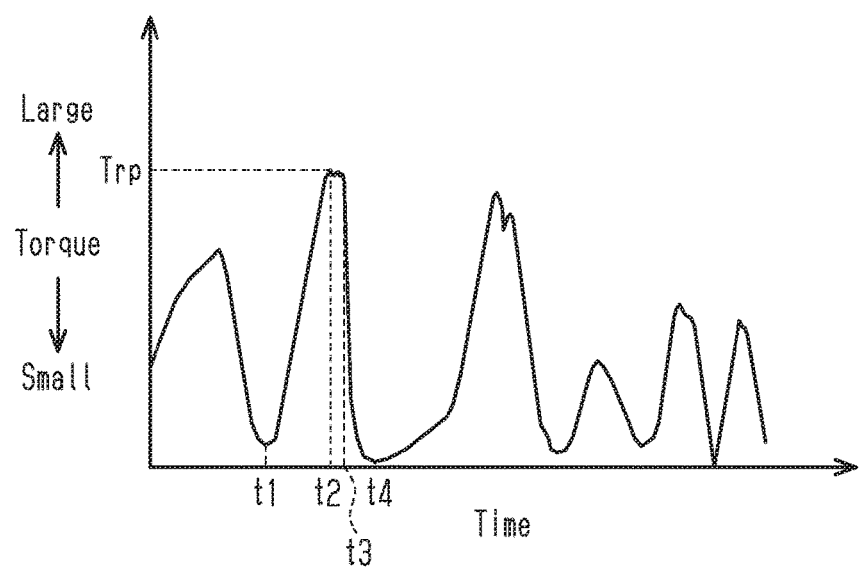
FIG. 3 is a graph showing one example of transition of a torque applied to the human-powered vehicle.

FIG. 3 shows one example of transition of the torque Tr in a case where the human-powered vehicle A is ridden and driven. As shown in FIG. 3, in a case where the human-powered vehicle A is ridden and driven, the torque Tr repeats increasing and decreasing. The controller 14 acquires a maximum value of the torque Tr in a range in which the torque Tr is switched from an increasing tendency to a decreasing tendency as the peak value Trp of the torque Tr. For example, in FIG. 3, the torque Tr is in the increasing tendency from time t1 to time t2, and the torque Tr is in the decreasing tendency from time t3 to time t4. The controller 14 acquires the maximum value of the torque Tr between time t2 and time t3 as the peak value Trp of the torque Tr.

The controller 14 permits the shifting operation of the transmission device T upon determining the torque Tr becomes equal to a predetermined proportion of the peak value Trp of the torque Tr. The predetermined proportion is a value at which the movement of the chain D3 is completed at a timing that differs from the peak value Trp of the torque Tr. The predetermined proportion is set by experiments and the like in advance. One example of the predetermined proportion is 80% of the peak value Trp (Trp×0.8).

Figure 4:
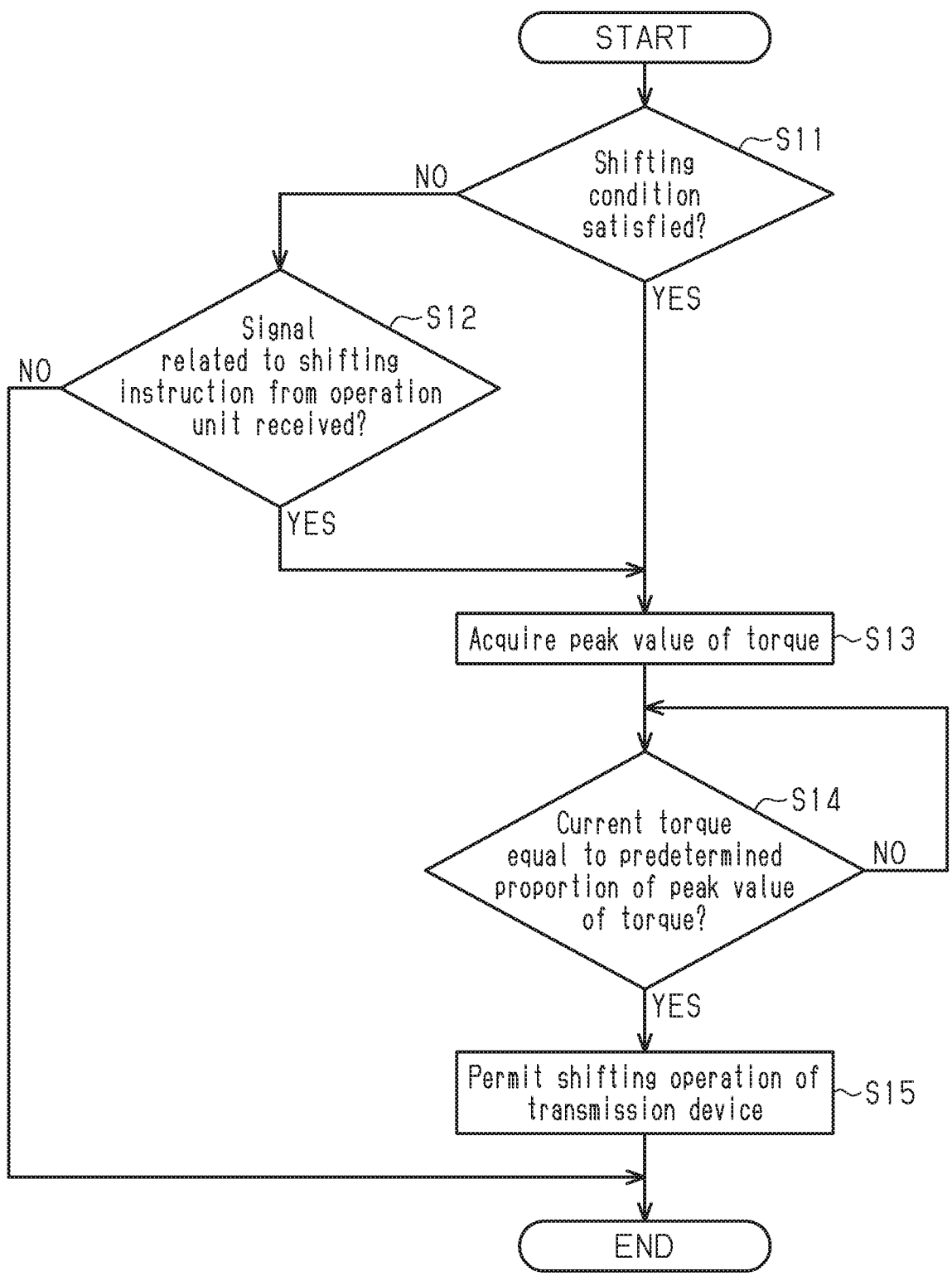
FIG. 4 is a flowchart illustrating one example of control procedure executed by an electronic controller of the control device shown in FIG. 1.

The flowchart in FIG. 4 illustrates one example of the procedure for executing control on the transmission device T. As illustrated in FIG. 4, in step S11, the controller 14 determines whether the shifting condition is satisfied. The shifting condition in step S11 corresponds to a case where the first reference value becomes greater than the upper limit threshold value THU or a case where the first reference value becomes less than the lower limit threshold value THL. Upon determining the shifting condition has not been satisfied, that is, upon determining the first reference value is between the upper limit threshold value THU and the lower limit threshold value THL, the controller 14 proceeds to step S12. In step S12, the controller 14 determines whether a signal related to a shifting instruction from the operation unit SL is received. Upon determining the signal related to the shifting instruction from the operation unit SL has not been received, the controller 14 temporarily ends the process.

Upon determining the shifting condition has been satisfied or upon determining the signal related to the shifting instruction from the operation unit SL has been received, the controller 14 proceeds to step S13. In step S13, the controller 14 acquires the peak value Trp of the torque Tr and then proceeds to step S14. In step S14, the controller 14 determines whether the current torque Trx is equal to the predetermined proportion of the peak value Trp of the torque Tr. During determination of step S14, the torque Tr is in the decreasing tendency (for example, between time t3 and time t4). The controller 14 repeats the determination of step S14 until the torque Trx decreases from the peak value Trp of the torque Tr and reaches the predetermined proportion of the peak value Trp.

Upon determining the current torque Trx is equal to the predetermined proportion of the peak value Trp of the torque Tr, the controller 14 proceeds to step S15. In step S15, the controller 14 permits the shifting operation of the transmission device T and then temporarily ends the process. Upon determining the current torque Trx is not equal to the predetermined proportion of the peak value Trp of the torque Tr, that is, upon determining the current torque Trx is greater than the predetermined proportion of the peak value Trp of the torque Tr, the controller 14 performs the determination of step S14 again.

Figure 5:
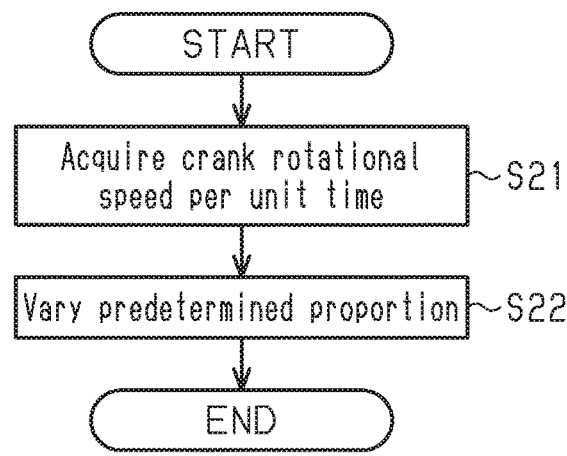
FIG. 5 is a flowchart illustrating one example of control procedure executed by the electronic controller.

The controller 14 is configured to vary the predetermined proportion. In one example, the controller 14 varies the predetermined proportion in accordance with the rotational speed of the crank C per unit time. The flowchart in FIG. 5 illustrates one example of the procedure for varying the predetermined proportion. As illustrated in FIG. 5, in step S21, the controller 14 acquires the rotational speed of the crank C per unit time and then proceeds to step S22. The controller 14 acquires the rotational speed of the crank C from the detection result of the detector 18A.

Figure 6:
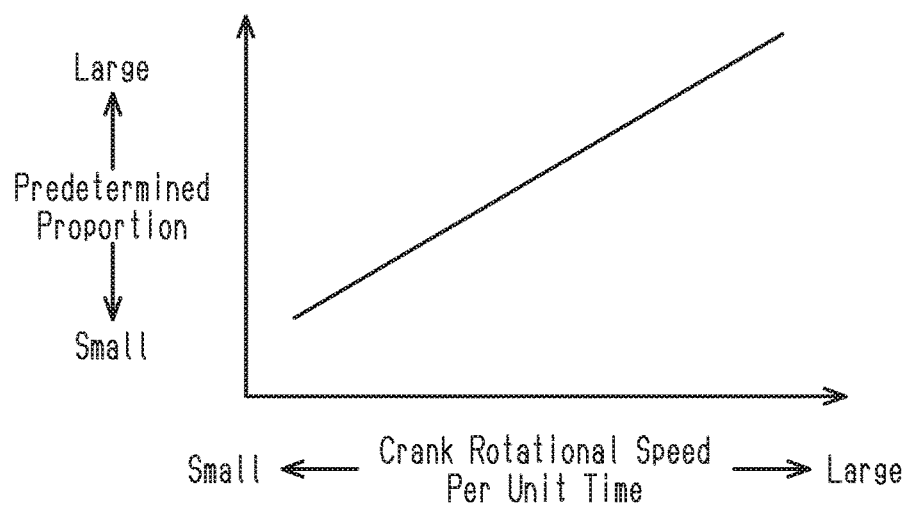
FIG. 6 is a map illustrating the relationship of a rotational speed of a crank per unit time and a predetermined proportion.

In step S22, the controller 14 varies the predetermined proportion and then temporarily ends the process. The controller 14 varies the predetermined proportion in accordance with a map of FIG. 6 illustrating the relationship of the rotational speed of the crank C per unit time and the predetermined proportion. As illustrated in FIG. 6, the predetermined proportion increases as the rotational speed of the crank C per unit time increases. That is, the predetermined proportion approaches the peak value Trp of the torque Tr as the rotational speed of the crank C per unit time increases.

The user riding the human-powered vehicle A rotates the crank C at a constant rhythm (cycle) most of the time. This produces a constant rhythm (cycle) in the torque Tr applied to the human-powered vehicle A. The transmission system 10 in the present embodiment controls the shifting operation of the transmission device T in cooperation with the peak value Trp of the torque Tr in the pulsation of the torque Tr so that shifting of the chain D3 is completed at a timing that differs from the peak value Trp of the torque Tr. Accordingly, the user is less likely to experience awkwardness during a shifting operation of the transmission device T.

Even in a case where the human-powered vehicle A is inclined, that is, even in a case where the gradient of a hill changes, a shifting operation of the transmission device T is performed in cooperation with the peak value Trp of the torque Tr. Thus, even in a case where the gradient of a hill changes, a shifting operation of the transmission device T is performed in correspondence with the gradient.

Second Embodiment

The transmission system 10 in accordance with the second embodiment will now be described with reference to FIG. 7. The transmission system 10 in accordance with the present embodiment differs from the transmission system 10 of the first embodiment in a process for setting a timing for starting operation of the transmission device T. In the description hereafter, same reference numerals are given to those components that are the same as the corresponding components of the transmission system 10 of the first embodiment. Such components will not be described in detail.

The controller 14 in accordance with the present embodiment controls the timing for starting operation of the transmission device T in accordance with at least one of a communication time of a control signal to the transmission device T, an operation time of the transmission device T, and a movement time of the linking member F3 resulting from operation of the transmission device. The communication time of the control signal to the transmission device T is stored in the storage 16 in advance. The operation time of the transmission device T and the movement time of the linking member resulting from operation of the transmission device for each transmission stage are stored in the storage 16 in advance. The controller 14 controls the timing for starting operation of the transmission device T taking into consideration at least one of the communication time of the control signal to transmission device T and the movement time of the linking member F3 resulting from operation of the transmission device so that the movement of the linking member F3 is completed at a timing that differs from the peak value Trp of the torque Tr. In one example, the controller 14 acquires time interval TM between peak value Trp1 of the torque Tr and peak value Trp2 of the torque Tr that is adjacent to the peak value Trp1. The controller 14 estimates that the time of peak value Trp3 of the torque Tr will be the time at which the time interval TM elapses from the time of the peak value Trp2. The controller 14 subtracts the communication time of the control signal to transmission device T, the operation time of the transmission device T, and the movement time of the linking member F3 resulting from operation of the transmission device from the time of the peak value Trp3 to calculate time Tf. The controller 14 sets the timing for starting operation of the transmission device T to a time that differs from time Tf. In one example, the controller 14 sets the timing for starting operation of the transmission device T at a time that is ahead of time Tf by a predetermined length of time. The predetermined length of time is set in advance.

Figure 7:
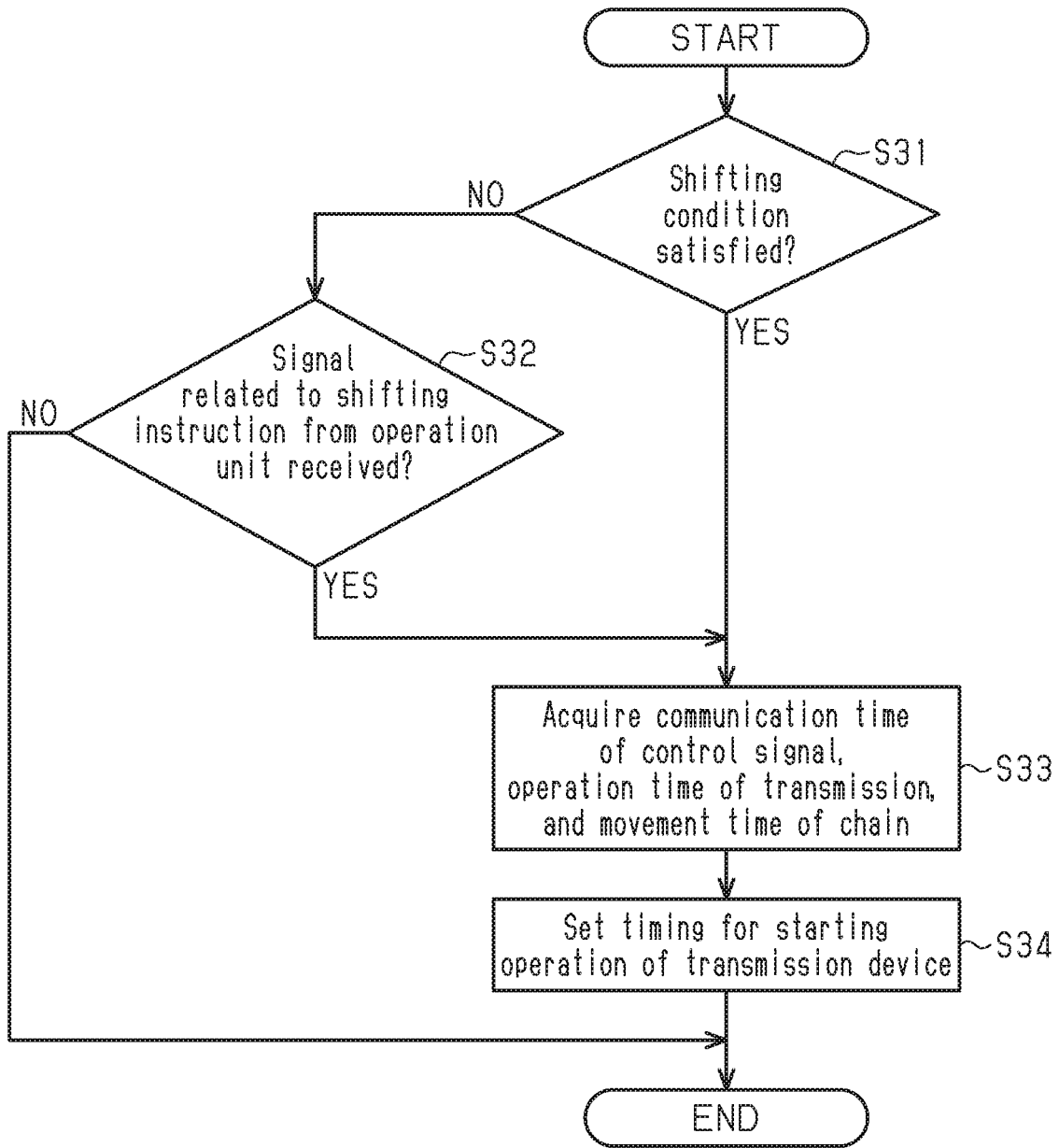
FIG. 7 is a flowchart related with a control device and a transmission system according to a second embodiment and illustrates one example of control procedure executed by the electronic controller of the control device shown in FIG. 1.

The flowchart in FIG. 7 illustrates one example of the procedure for setting the timing for starting operation of the transmission device T. As illustrated in FIG. 7, in step S31, the controller 14 determines whether the shifting condition is satisfied. The shifting condition in step S31 is the same as the shifting condition in step S11 in FIG. 4. Upon determining the shifting condition has not been satisfied, that is, upon determining the first reference value is between the upper limit threshold value THU and the lower limit threshold value THL, the controller 14 proceeds to step S32. In step S32, the controller 14 determines whether the signal related to the shifting instruction from the operation unit SL is received. Upon determining the signal related to the shifting instruction from the operation unit SL has not been received, the controller 14 temporarily ends the process.

Upon determining the shifting condition has been satisfied or upon determining the signal related to the shifting instruction from the operation unit SL has been received, the controller 14 proceeds to step S33. In step S33, the controller 14 acquires each of the communication time of the control signal to transmission device T, the operation time of the transmission device T, and a movement time of the chain D3 resulting from operation of the transmission device. Then, the controller 14 proceeds to step S34. The controller 14 acquires the operation time of the transmission device T and the movement time of the chain D3 resulting from operation of the transmission device in accordance with the number of transmission stages shifted by the transmission device T. In step S34, the controller 14 sets the timing for starting operation of the transmission device T and then temporarily ends the process.

Modifications

The description related with the above embodiments exemplifies, without any intention to limit, an applicable form of a control device and a transmission system according to the present disclosure. In addition to the embodiments described above, the control device and the transmission system in accordance with the present disclosure are applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

In the first embodiment, the controller 14 can vary the predetermined proportion in accordance with at least one of the communication time of the control signal to transmission device T from the controller 14, the operation time of the transmission device T, and the movement time of the linking member F3 resulting from operation of the transmission device instead of the rotational speed of the crank C per unit time. The communication time of the control signal to the transmission device T is stored in the storage 16 in advance. The operation time of the transmission device T and the movement time of the linking member resulting from operation of the transmission device for each transmission stage are stored in the storage 16 in advance. The controller 14 controls the timing for starting operation of the transmission device T taking into consideration at least one of the communication time of the control signal to transmission device T and the movement time of the linking member F3 resulting from operation of the transmission device so that the movement of the linking member F3 is completed at a timing that differs from the peak value Trp of the torque Tr. The timing for starting operation of the transmission device T is controlled in the same manner as the second embodiment.

In each embodiment, the controller 14 can change the shifting condition in accordance with a second reference value that changes as the transmission device T shifts stages. The second reference value includes at least one of the vehicle information related to the human-powered vehicle A and user information related to the user riding the human-powered vehicle A. The user information includes at least one of heartrate, myogenic potential, amount of perspiration, and body temperature.

The controller 14 changes the threshold value TH in accordance with the level of the second reference value. The controller 14 changes the threshold value TH in accordance with the difference of the second reference value subsequent to completion of the shifting and the second reference value prior to completion of the shifting (hereafter, "reference value difference"). Specifically, in a case where the controller 14 controls the transmission device T, the controller 14 changes the threshold value TH in accordance with the shifting condition determined based on the second reference value. In one example, the shifting condition is set based on an absolute value of the reference value difference and a predetermined difference. Specifically, in a case where the controller 14 controls the transmission device T, the controller 14 changes the threshold value TH in accordance with the relationship of the absolute value of the reference value difference and the predetermined difference. The predetermined difference is set, for example, based on a predetermined width that determines a predetermined range of the upper limit threshold value THU and the lower limit threshold value THL. The predetermined difference includes at least one of a first predetermined difference, a second predetermined difference, a third predetermined difference, and a fourth predetermined difference. The predetermined difference can be updated in accordance with a changed threshold value TH each time the threshold value TH is changed, or can be a fixed value.

In a case where the controller 14 controls the transmission device T to increase the transmission ratio and the absolute value of the reference value difference is greater than or equal to the first predetermined difference, the controller 14 increases the upper limit threshold value THU. In a case where the controller 14 controls the transmission device T to increase the transmission ratio and the absolute value of the reference value difference is less than the second predetermined difference, the controller 14 maintains the upper limit threshold value THU. The second predetermined difference is set to less than or equal to the first predetermined difference. In one example, the second predetermined difference is set to the same value as the first predetermined difference. In a case where the controller 14 controls the transmission device T to increase the transmission ratio, the controller 14 can decrease the upper limit threshold value THU if a first condition is satisfied or return the upper limit threshold value THU to the initial the upper limit threshold value THU if the first condition is satisfied. The controller 14 can determine that the first condition is satisfied upon determining a state in which the absolute value of the reference value difference is less than the second predetermined difference occurs successively for a predetermined number of times or determine that the first condition is satisfied upon determining the absolute value of the reference value difference is less than a predetermined difference that is smaller than second predetermined difference.

In a case where the controller 14 controls the transmission device T to decrease the transmission ratio and the absolute value of the reference value difference is greater than or equal to the third predetermined difference, the controller 14 decreases the lower limit threshold value THL. In a case where the controller 14 controls the transmission device T to decrease the transmission ratio and the absolute value of the reference value difference is less than the fourth predetermined difference, the controller 14 maintains the lower limit threshold value THL. The fourth predetermined difference is set to less than or equal to the third predetermined difference. In one example, the fourth predetermined difference is set to the same value as the third predetermined difference. In a case where the controller 14 controls the transmission device T to decrease the transmission ratio, the controller 14 can increase the lower limit threshold value THL if a second condition is satisfied or return the lower limit threshold value THL to the initial the lower limit threshold value THL if the second condition is satisfied. In one example, the controller 14 can determine that the second condition is satisfied upon determining a state in which the absolute value of the reference value difference is less than the fourth predetermined difference occurs successively for a predetermined number of times or determine that the second condition is satisfied upon determining the absolute value of the reference value difference is less than a predetermined difference that is smaller than fourth predetermined difference.

In each embodiment and modification, the peak value Trp of the torque Tr can be acquired by any process. In one example, the controller 14 can acquire the peak value of the torque Tr after a predetermined number of peaks of the torque Tr as the peak value Trp.

In each embodiment and modification, the controller 14 can set the shifting wait time that is a time from a point of time at which the shifting condition is satisfied to a point of time at which the shifting operation of the transmission device T is permitted in accordance with the number of peaks of the torque Tr from the point of time at which the signal related to the shifting instruction from the operation unit SL is received or at which the shifting condition is satisfied. In one example, upon determining the number of peaks of the torque Tr reaches a first threshold value TH1 from a point of time at which the signal related to the shifting instruction from the operation unit SL is received or at which the shifting condition is satisfied, the controller 14 permits the shifting operation of the transmission device T if the torque Tr becomes equal to a predetermined proportion of the peak value Trp of the torque Tr, the peak value Trp of the torque Tr being a value of the torque Tr at a time when the number of peaks of the torque Tr has reached the first threshold value TH1. The first threshold value TH1 is variable. The first threshold value TH1 can be a fixed value.

Figure 8:
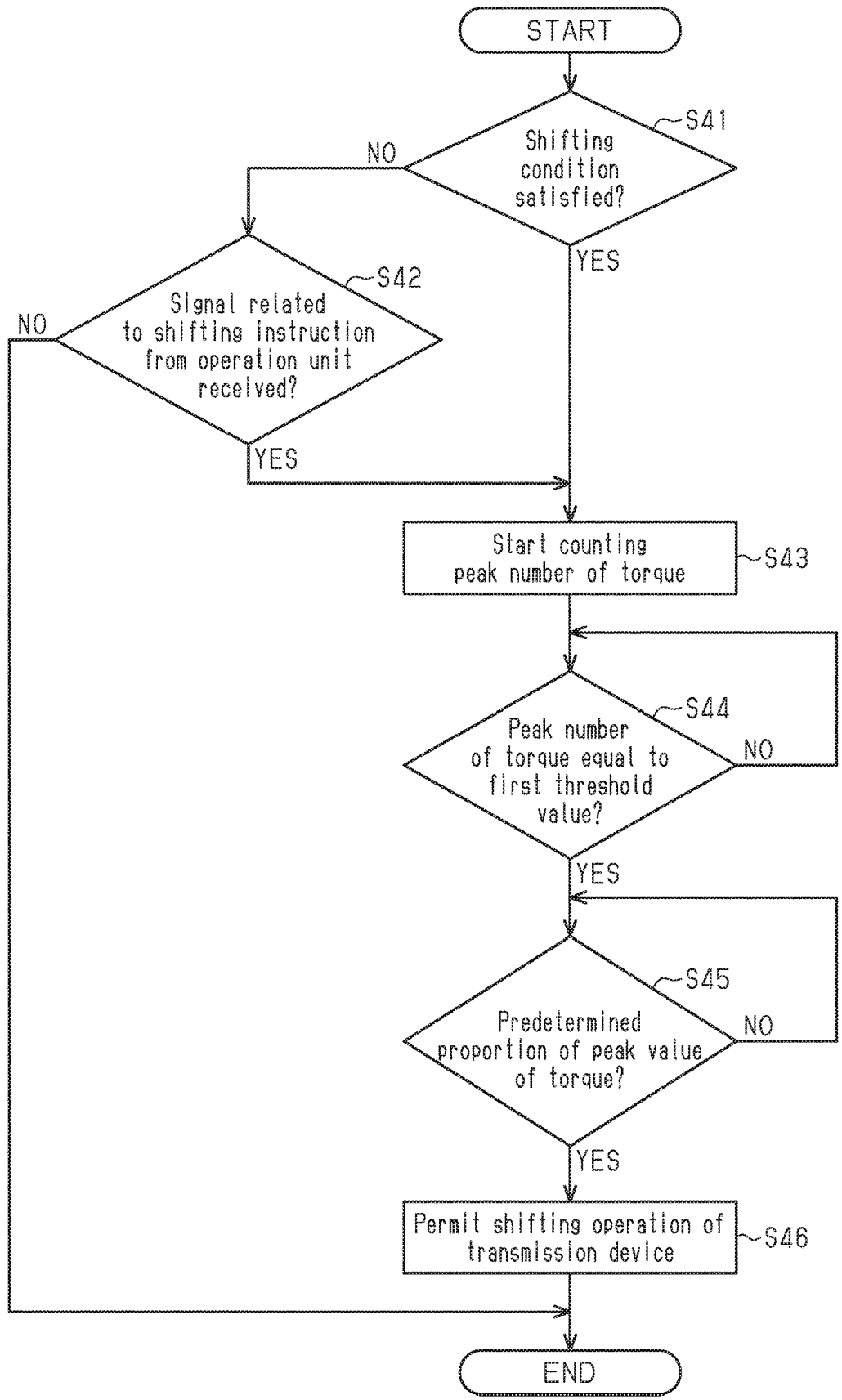
FIG. 8 is a flowchart related with a control device and a transmission system according to a modification and illustrates one example of control procedure executed by the electronic controller of the control device shown in FIG. 1.

The flowchart in FIG. 8 illustrates one example of a procedure for setting the timing for starting operation of the transmission device T. The determinations in steps S41 and S42 are the same as the determinations in steps S11 and S12 in step 4. Upon determining the shifting condition has been satisfied or upon determining the signal related to the shifting instruction from the operation unit SL has been received, the controller 14 proceeds to step S43. In step S43, the controller 14 counts the number of peaks of the torque Tr and then proceeds to step S44. In step S44, the controller 14 determines whether the number of peaks of the torque Tr reached the first threshold value TH1. Upon determining the number of peaks of the torque Tr is less than the first threshold value TH1, the controller 14 performs the determination of step S44 again. That is, the controller 14 repeats the determination in step S44 until the number of peaks of the torque Tr reaches the first threshold value TH1.

Upon determining the number of peaks of the torque Tr has reached the first threshold value TH1, the controller 14 proceeds to step S45. In step S45, the controller 14 determines whether the current torque Trx is equal to a predetermined proportion of the peak value Trp of the torque Tr. Upon determining the number of peaks of the torque Tr has reached the first threshold value TH1, the controller 14 multiplies the peak value Trp of the torque Tr at which the number of peaks of the torque Tr becomes equal to the first threshold value TH1 by the predetermined proportion. The controller 14 monitors the torque Tr that decreases from the peak value Trp of the torque Tr at which the number of peaks of the torque Tr becomes equal to the first threshold value TH1 to perform the determination in step S45. Upon determining the current torque Trx is not equal to the predetermined proportion of the peak value Trp of the torque Tr, the controller 14 performs the determination of step S45 again. That is, the controller 14 repeats the determination of step S45 until the current torque Trx decreases to the predetermined proportion of the peak value Trp of the torque Tr. Upon determining the current torque Trx has reached the predetermined proportion of the peak value Trp of the torque Tr, the controller 14 proceeds to step S46. In step S46, the controller 14 permits the shifting operation of the transmission device T and then temporarily ends the process.

In the process illustrated in FIG. 8, upon determining the first threshold value TH1 is an even number, the controller 14 acquires the peak value Trp of the torque Tr corresponding to depression of the same one of the two pedals PD. Accordingly, upon determining the first threshold value TH1 is an even number, the transmission ratio of the human-powered vehicle A is changed subsequent to the depression of the same one of the two pedals PD. Upon determining the first threshold value TH1 is an odd number, the controller 14 alternately acquires the peak value Trp of the torque Tr corresponding to depression of one of the pedals PD and the peak value Trp of the torque Tr corresponding to depression of the other one of the pedals PD. In this way, upon determining the first threshold value TH1 is an odd number, the transmission ratio of the human-powered vehicle A is changed subsequent to depression of one of the pedals PD and then the transmission ratio of the human-powered vehicle A is changed subsequent to depression of the other pedal PD. This allows for selection of shifting resulting from depression of one pedal PD and the shifting resulting from alternative depression of the two pedals PD. Thus, in a case where the user sets the first threshold value TH1, shifting can be performed at a rhythm preferred by the user.

In each embodiment and modification, the controller 14 is configured to change the number of transmission stages shifted by the transmission device T to any transmission stage. Upon determining the current torque Trx becomes equal to the predetermined proportion of the peak value Trp of the torque Tr, the controller 14 can change the transmission stage of the transmission device T, for example, over multiple stages. One example of the multiple stages is two stages.

The controller 14 can change the number of transmission stages shifted by the transmission device T, for example, in accordance with the rotational speed of the crank C per unit time. In one example, the transmission stage in a case where the rotational speed of the crank C per unit time is greater than or equal to a predetermined threshold value is smaller than the transmission stage in a case where the rotational speed of the crank C per unit time is less than the threshold value. In one example, the transmission stage increases as the rotational speed of the crank C per unit time decreases.

In each embodiment and modification, the controller 14 can calculate the rotational speed of the crank C per unit time in accordance with a peak cycle of the torque Tr applied to the crank C. In this case, the detection device 18 can omit the detector 18A.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device comprising:
    an electronic controller configured to control a transmission device of a human-powered vehicle in accordance with a shifting condition,
    the electronic controller being configured to monitor a torque applied to the human-powered vehicle upon determining the human-powered vehicle is ridden and driven,
    the electronic controller being configured to acquire a peak value of the torque, using the torque monitored while the human-powered vehicle is being ridden and driven, upon determining that the shifting condition has been satisfied, and
    the electronic controller being configured to permit a shifting operation of the transmission device based on a relationship between the torque applied to the human-powered vehicle and the peak value of the torque.

2. The control device according to claim 1, wherein
    the electronic controller is configured to permit the shifting operation of the transmission device upon determining the torque is equal to a predetermined proportion of the peak value of the torque.

3. The control device according to claim 2, wherein
the human-powered vehicle includes a crank, and
the electronic controller is configured to vary the predetermined proportion in correspondence with a rotational speed of the crank.

4. The control device according to claim 2, wherein
the human-powered vehicle includes the transmission device, a crank, a wheel, a driving rotation body rotated as the crank rotates, a driven rotation body provided on the wheel, and a linking member wound around the driving rotation body and the driven rotation body, the transmission device being configured to move the linking member between a first rotation body and a second rotation body provided on at least one of the driving rotation body and the driven rotation body; and
the electronic controller is configured to vary the predetermined proportion in accordance with at least one of a communication time of a control signal from the electronic controller to the transmission device, an operation time of the transmission device, and a movement time of the linking member resulting from operation of the transmission device.

5. The control device according to claim 1, wherein
the shifting condition is set based on a first reference value and a threshold value of the human-powered vehicle, and
the electronic controller is configured to automatically control the transmission device in accordance with the shifting condition.

6. The control device according to claim 1, wherein
the shifting condition is set based on an input to an operation unit of the human-powered vehicle, and
the electronic controller is configured to control the transmission device in accordance with the input to the operation unit.

7. The control device according to claim 1, wherein
the peak value of the torque is a maximum value of the torque acquired in a range in which the torque is switched from an increasing tendency to a decreasing tendency.

8. The control device according to claim 1, wherein
the electronic controller is configured to set a shifting wait time that is a time from a point of time at which the shifting condition of the human-powered vehicle is satisfied to a point of time at which the shifting operation of the transmission device is permitted in accordance with a number of peaks of the torque from a point of time at which a signal related to a shifting instruction from an operation unit of the human-powered vehicle is received or the point of time at which the shifting condition is satisfied.

9. The control device according to claim 8, wherein
upon determining the number of peaks of torque from the point of time at which the electronic controller receives the signal related to the shifting instruction from the operation unit or the point of time at which the shifting condition is satisfied becomes equal to a first threshold value, the electronic controller is configured to permit a shifting operation of the transmission device if the torque becomes equal to a predetermined proportion of the peak value of the torque, the peak value of the torque being a value of the torque at a time when the number of peaks of the torque has reached the first threshold value.

10. The control device according to claim 9, wherein
the first threshold value is variable.

11. The control device according to claim 1, wherein
the electronic controller is configured to calculate a rotational speed of a crank of the human-powered vehicle in accordance with a peak cycle of the torque applied to the crank.

12. A transmission system comprising the control device according to claim 1 and further comprising:
the transmission device.

13. A control device configured to control a transmission device of a human-powered vehicle, the human-powered vehicle including a crank, a wheel, a driving rotation body rotated as the crank rotates, a driven rotation body provided on the wheel, a linking member wound around the driving rotation body and the driven rotation body, and the transmission device, wherein the transmission device moves the linking member between a first rotation body and second rotation body provided on at least one of the driving rotation body and the driven rotation body, the control device comprising:
an electronic controller configured to monitor a torque applied to the human-powered vehicle upon determining the human-powered vehicle is ridden and driven,
the electronic controller being configured to acquire a peak value of the torque, using the torque monitored while the human-powered vehicle is being ridden and driven, and
the electronic controller being configured to control the transmission device so that movement of the linking member from one of the first rotation body and the second rotation body to the other one of the first rotation body and the second rotation body is completed at a timing that differs from the peak value of the torque.

14. A control device configured to control a transmission device of a human-powered vehicle, the human-powered vehicle including a crank, a wheel, a driving rotation body rotated as the crank rotates, a driven rotation body provided on the wheel, a linking member wound around the driving rotation body and the driven rotation body, and the transmission device, wherein the transmission device moves the linking member between a first rotation body and second rotation body provided on at least one of the driving rotation body and the driven rotation body, the control device comprising:
an electronic controller configured to monitor a torque applied to the human-powered vehicle upon determining the human-powered vehicle is ridden and driven,
the electronic controller being configured to acquire a peak value of the torque, using the torque monitored while the human-powered vehicle is being ridden and driven, and the electronic controller being configured to control a timing for starting operation of the transmission device in accordance with at least one of a communication time of a control signal to the transmission device, an operation time of the transmission device, and a movement time of the linking member resulting from operation of the transmission device, and
the communication time of the control signal to the transmission device, the operation time of the transmission device, and the movement time of the linking member resulting from operation of the transmission device being stored in advance.

* * * * *